United States Patent [19]
Fanning et al.

[11] Patent Number: 5,525,852
[45] Date of Patent: *Jun. 11, 1996

[54] BANDED ELECTROMAGNETIC STATOR CORE

[75] Inventors: Alan W. Fanning; Aaron A. Gonzales; Mahadeo R. Patel, all of San Jose; Eugene E. Olich, Aptos, all of Calif.

[73] Assignee: General Electric Company, San Jose, Calif.

[ * ] Notice: The term of this patent shall not extend beyond the expiration date of Pat. No. 5,300,845.

[21] Appl. No.: 186,746

[22] Filed: Jan. 25, 1994

Related U.S. Application Data

[62] Division of Ser. No. 43,051, Apr. 5, 1993, Pat. No. 5,300,845.

[51] Int. Cl.$^6$ .................................................. H02K 1/06
[52] U.S. Cl. ........................ 310/217; 310/42; 310/259; 310/271
[58] Field of Search .................................... 310/271, 217, 310/216, 218, 254, 259, 42, 91, 208, 11, 12; 417/50, 356, 416, 417; 336/210

[56] References Cited

U.S. PATENT DOCUMENTS

| | | | |
|---|---|---|---|
| 4,179,630 | 12/1979 | Stuber | 310/15 |
| 4,882,514 | 11/1989 | Brynsvold et al. | 310/208 |
| 5,006,748 | 4/1991 | Wintermute | 310/254 |
| 5,195,231 | 3/1993 | Fanning et al. | 310/11 |
| 5,300,845 | 4/1994 | Fanning et al. | 310/217 |

*Primary Examiner*—R. Skudy
*Attorney, Agent, or Firm*—James E. McGinness

[57] ABSTRACT

A stator core for an electromagnetic pump includes a plurality of circumferentially adjoining groups of flat laminations disposed about a common centerline axis and collectively defining a central bore and a discontinuous outer perimeter, with adjacent groups diverging radially outwardly to form V-shaped gaps. An annular band surrounds the groups and is predeterminedly tensioned to clamp together the laminations, and has a predetermined flexibility in a radial direction to form substantially straight bridge sections between the adjacent groups.

13 Claims, 4 Drawing Sheets

BANDED ELECTROMAGNETIC STATOR CORE

The U.S. Government has rights in this invention in accordance with Contract No. DE-AC03-89SF17445 awarded by the Department of Energy.

This is a divisional application of U.S. patent application Ser. No. 08/043,051 filed on Apr. 5, 1993, issued on Apr. 4, 1994 as U.S. Pat. No. 5,300,845.

FIELD OF THE INVENTION

The present invention relates generally to electromagnetic pumps, and, more specifically, to electrical stators therein.

BACKGROUND OF THE INVENTION

In one type of nuclear reactor power plant, liquid metal, such as liquid sodium, is used for the coolant which is heated by the reactor core. The liquid metal is circulated within the reactor by a plurality of annular linear-flow electromagnetic induction pumps which propel the liquid metal using electromagnetic force.

A typical electromagnetic pump includes an annular flow channel or duct surrounded by a column of alternately vertically stacked annular electrical stator coils and magnetic stator iron cores collectively forming a stator. Electrical current carried by the coils induces magnetic flux which is channeled through the cores in a predetermined direction for inductively propelling the liquid metal through the flow channel, An electromagnetic pump may have solely a single stator surrounding the outside of the flow channel for propelling the liquid metal therethrough. Or, an electromagnetic pump may have double stators including an outer stator surrounding the flow channel, and an inner stator disposed radially inwardly of the flow channel. Each stator is similarly configured with alternating layers of stator coils supported by stator cores. Since the double stator electromagnetic pump is effective for generating magnetic flux both radially inwardly and radially outwardly of the flow channel, it is typically more effective for propelling the liquid metal axially through the flow channel.

In both types of pumps, the stator coils typically include a plurality of turns or windings of copper electrical conductors disposed coaxially about the longitudinal centerline axis of the pump. The alternating stacks of stator coils are supported on respective stator cores, with each stator core including a plurality of circumferentially adjoining iron laminations. The laminations are typically flat, sheet metal components which are relatively thin for reducing eddy current losses therein. Since the laminations are a constant thickness and extend radially outwardly from the pump centerline axis, they can tightly abut each other at their radially inner ends, but at their radially outer ends a larger circumference is provided than the laminations have the capability of filling. Accordingly, the laminations are typically configured in groups having a constant thickness in the circumferential direction, with generally V-shaped gaps being formed between adjacent ones of the groups.

Since the laminations are individual elements and subject to vibration during operation of the pump, they must be suitably clamped together to restrain vibration thereof. For example, the laminations may be fixedly joined to each other by a suitable adhesive, or may be joined together in the groups by suitable mechanical fasteners, or may also be joined together using a band or wire extending circumferentially around the outer ends of the groups, which band is placed in tension to clamp together the several groups in a complete ring as disclosed for example in U.S. Pat. No. 4,882,514-Brynavoid et al, which is assigned to the present assignee.

In one design being developed, the band is a substantially 360° ring having a single split defining two ends which are generally L-shaped with radially outwardly extending flanges through which a nut and bolt fastener is provided to clamp together the band ends to place the band in tension for clamping together the several lamination groups. In tests of this clamping band design, the ability to maintain adequate tightness in the band for suitably clamping together the lamination groups was obtained only after repeated shakedown cycles of tightening the fastener, heating and maintaining the so assembled stator core at elevated temperature for about a week, followed by cool-down to a hot standby condition and repeating this cycle.

The tests suggested that the initial band tension was being lost in cycling of the stator core due in part to the eccentrically loaded fastener; relatively high friction between the bind and the outer edges of the individual laminations which affected the ability to maintain uniform tension around the circumference of the band and a uniform conformance of the band to the perimeter contour of the lamination groups around the circumference of the band; and thermal expansion of the lamination groups which exceeded expansion of the clamping band which loosened fie band upon thermal contraction of the lamination groups; with the initial circular configuration of the band upon assembly being distorted by fie differential thermal expansion between the lamination groups and the band.

The ability to maintain a suitable tension in the band during operation of the stator core in the electromagnetic pump is required to maintain structural integrity of the stator core during its useful lifetime while restraining vibration thereof. Since the stator cores will necessarily undergo cycling from relatively low to relatively high temperatures during operation in response to cyclical operation of the reactor core itself, a suitable band clamp which can maintain adequate tension therein and clamping together of the lamination groups is required.

SUMMARY OF THE INVENTION

A stator core for an electromagnetic pump includes a plurality of circumferentially adjoining groups of flat laminations disposed about a common centerline axis and collectively defining a central bore and a discontinuous outer perimeter, with adjacent groups diverging radially outwardly to form V-shaped gaps. An annular band surrounds the groups and is predeterminedly tensioned to clamp together the laminations, and has a predetermined flexibility in a radial direction to form substantially straight bridge sections between the adjacent groups.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENTS

Figure 1:
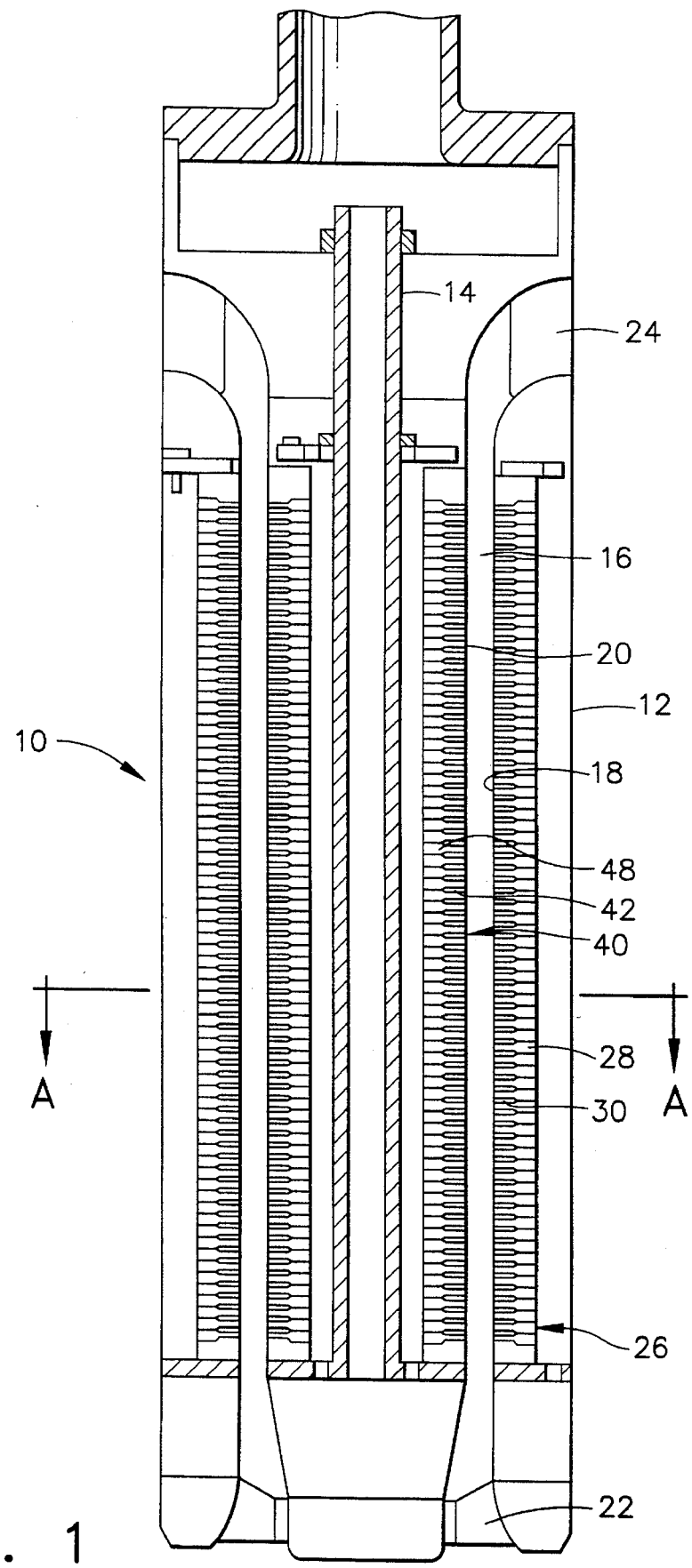
FIG. 1 is an elevation, schematic representation of an exemplary double stator electromagnetic pump having an outer stator in accordance with one embodiment of the present invention.

Illustrated schematically in FIG. 1 is an exemplary double stator, annular, linear flow, electromagnetic induction pump 10 configured for propelling a liquid metal such as liquid sodium therethrough. The Dump 10 includes a cylindrical housing 12 surrounding a central support post 14. The Dump 10 also includes an annular flow channel or duct 16 for magnetically impelling the liquid metal therethrough which is defined by an annular outer flow conduit 18 and a radially inwardly spaced, concentric, annular inner flow conduit An inlet 22 is provided at the bottom of the flow channel 16 for receiving the liquid metal, and an outlet 24 is provided at the top of the flow channel 16 for discharging the liquid metal therefrom.

The pump 10 further includes an annular outer stator 26 surrounding the outer conduit 18 within the housing 12. The outer stator 26 includes a plurality of alternately stacked annular outer stator cores 28 and annular outer stator coils 30. The outer coils 30 conventionally include a plurality of turns or windings of electrical conductors of copper strips or ribbons, for example, which are suitably electrically insulated. The pump 10 also includes a similar annular inner stator 40 having alternately stacked annular inner coils 42 and annular inner cores 48. The respective outer and inner coils 30, 42 are configured to carry electrical current which induces electromagnetic flux in the respective outer and inner cores 28, 48 which impels the liquid metal upwardly through the flow channel 16 from the inlet 22 for discharge through the outlet 24 as is conventionally known.

Figure 2:
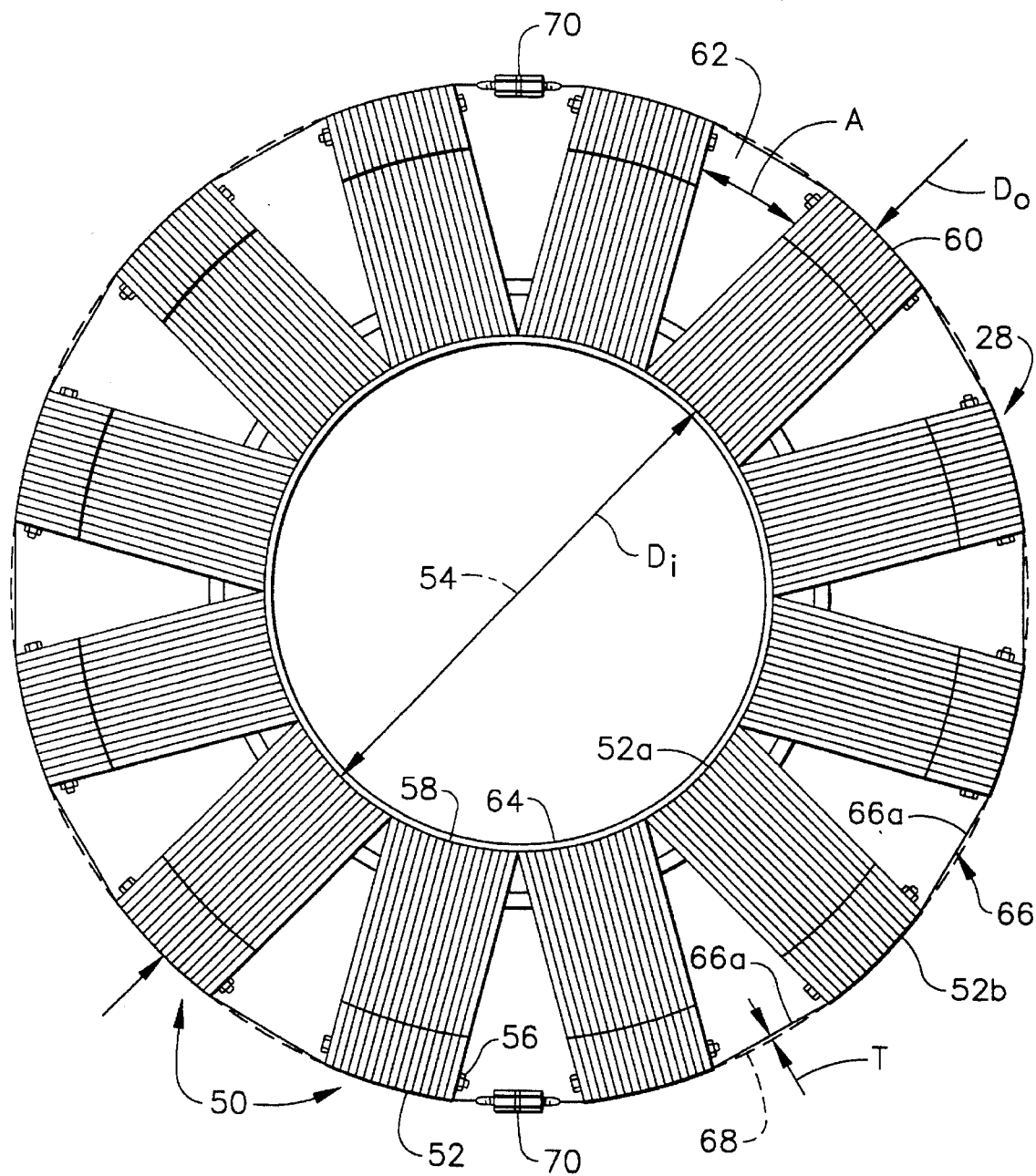
FIG. 2 is a transverse sectional view through the pump illustrated in FIG. 1 taken along line A—A which illustrates only the outer stator in accordance with one embodiment of the present invention.

FIG. 2 illustrates in more particularity an exemplary one of the outer stator cores 28 in accordance with an exemplary embodiment of the present invention. The outer core 28 includes a plurality of circumferentially adjoining groups 50 of flat iron laminations 52 disposed about a common centerline axis 54, which is also the centerline axis of the pump 10. Each lamination 52 is preferably a conventional sheet metal component having a constant, relatively thin thickness for reducing eddy current losses during operation. The laminations 52 are conventionally joined in the groups 50, with each group 50 also having a constant thickness in the circumferential direction relative to the centerline axis 54, with the individual laminations 52 being joined in abutting contact with each other by a suitable adhesive, or by mechanical fasteners 56 such as the nuts and bolts illustrated.

The laminations 52 have radially inner ends 52a which collectively define an annular central bore 58 having an inner diameter $D_i$, and radially outer ends 52b which collectively define a discontinuous annular outer perimeter 60 having an outer diameter $D_o$. Since the circumference of the outer core 28 at the perimeter 60 is necessarily larger than the circumference at the bore 58, and since the laminations 52 and groups 50 have constant thicknesses, adjacent ones of the groups 50 necessarily diverge radially outwardly from each other at an acute angle A therebetween to form a V-shaped gap 62 between respective ones of the adjacent groups 50.

In the exemplary embodiment illustrated in FIG. 2, the outer core 28 preferably also includes a circular support ring 64 disposed coaxially in the bore 58 for providing an outer flow boundary of the flow duct 16 and for providing a form about which the groups 50 at the lamination inner ends 52a are aligned and radially supported. And, an annular clamping band 66 in accordance with one embodiment of the present invention is disposed coaxjelly about the centerline axis 54 and surrounds the groups 50 along the lamination outer ends 52b. The band 66 is predeterminedly tensioned to effect a tangential clamping force to clamp together the laminations 52 in each of the groups 50, and clamp together the groups 50 at the bore 58 to effect a structurally rigid outer core 28 and restrain movement of the individual laminations 52 and the groups 50 into the gaps 62. By suitably tensioning the band 66, the band experiences a tensile hoop stress, with radially inwardly directed forces being channeled from the band 66 and through the groups 50 into the ring 64 which effects a circumferential compressive hoop stress along the lamination inner ends 52a as well as within the support ring 64. The ring 64 may or may not be used as desired, with the band 66 still suitably clamping together the several lamination groups 50 to form a rigid ring assembly thereof. The fasteners 56 are provided for suitably clamping together the respective laminations 52 in each of the groups 50 at the periphery of the outer core 28.

Although bands have been developed for joining together the lamination groups 50 as described above, such development bands were subject to tension release during cyclical operation of the outer core 28 as it thermally expands and contracts during operation in the pump 10. In one design developed, i.e. such as in the Brynsvoid et al patent referenced above, a circular band surrounds the laminations and is subject to plastic deformation during thermal expansion as the lamination groups 50 expand radially more than the expansion of such band, which, upon thermal contraction, results in a reduction and possibly loss of tension in the band.

However, in accordance with one object of the present invention, the band 66 is suitably configured for retaining adequate tension therein during thermal cyclical operation of the outer core 28 as it expands and contracts during operation.

More specifically, the band 66 preferably has a relatively small thickness t in the radial direction relative to the centerline axis 54 for providing a predetermined flexibility thereof in the radial direction relative to the centerline axis 54 so that upon initial tensioning of the band 66 it forms substantially straight bridge sections 66a bridging the gaps 62 between all the adjacent groups 52. The band 66, however, has a suitable cross-sectional area so that it is relatively stiff in the circumferential direction around the outer core 28 for effecting the predetermined tension therein without plastic deformation thereof. The desired radial flexibility of the band 66 allows the band 66 to conform to the arcuate shape of the groups 52 at the lamination outer ends 52b while at the same time forming the straight bridge section 66a between the adjacent groups 50 which results in a shorter circumferential length of the entire band 66 around the perimeter 60.

If the band 66 is not sufficiently flexible in the radial direction, it will initially form a substantially circular configuration around the perimeter 60 as indicated in the dashed line labeled 68, which circular configuration 68 was obtained in the previous development band. For example, the relatively thin band 66 in accordance with the present invention may have a thickness of about 36 mils (0.9mm) for exemplary stainless steel material, whereas the undesirably rigid development band effecting the circular configuration 68 had a thickness of about 80 mils (2.0 mm) which is about twice as thick. Visually, the as-installed difference between the undesirable circular configuration 68 and the desirable straight-sided bridge sections 66a of the present invention is barely perceptible, with the latter having the ability to maintain tension in the band 66 during thermal expansion and contraction cycles more effectively than the former.

Since the band 66 is preferably relatively thin, it will also have less cross-sectional moment of inertia and, therefore, results in reduced bending stresses along its radially inner and radially outer surfaces. This will allow the band 66 to more readily conform to the arcuate contour of the lamination outer ends 52b and to form the substantially straight bridge sections 66a which necessarily require bending of the band 66 at the juncture between the end-most laminations 52 and the respective gaps 62. The reduced bending stresses within the band 66 ensure that the band 66 is suitably flexible for following these preferred contours without undesirable plastic deformation of the band 66 which will reduce tension in the band 66.

The initial straight bridge sections 66a are preferred since the resulting length of the band 66 for a given amount of tension therein is less than the length of an analogous band having the circular configuration 68. Accordingly, during thermal expansion of the outer core 28, the bridge sections 66a are already straight and in tension and merely elastically extend without the radial bending component which would necessarily occur with the circular configuration 68. In this way, the band 66 experiences less slackening than can occur from the fully circular configuration 68 during the thermal cycles, and, therefore, loosening of the band 66 is reduced.

Figure 3:
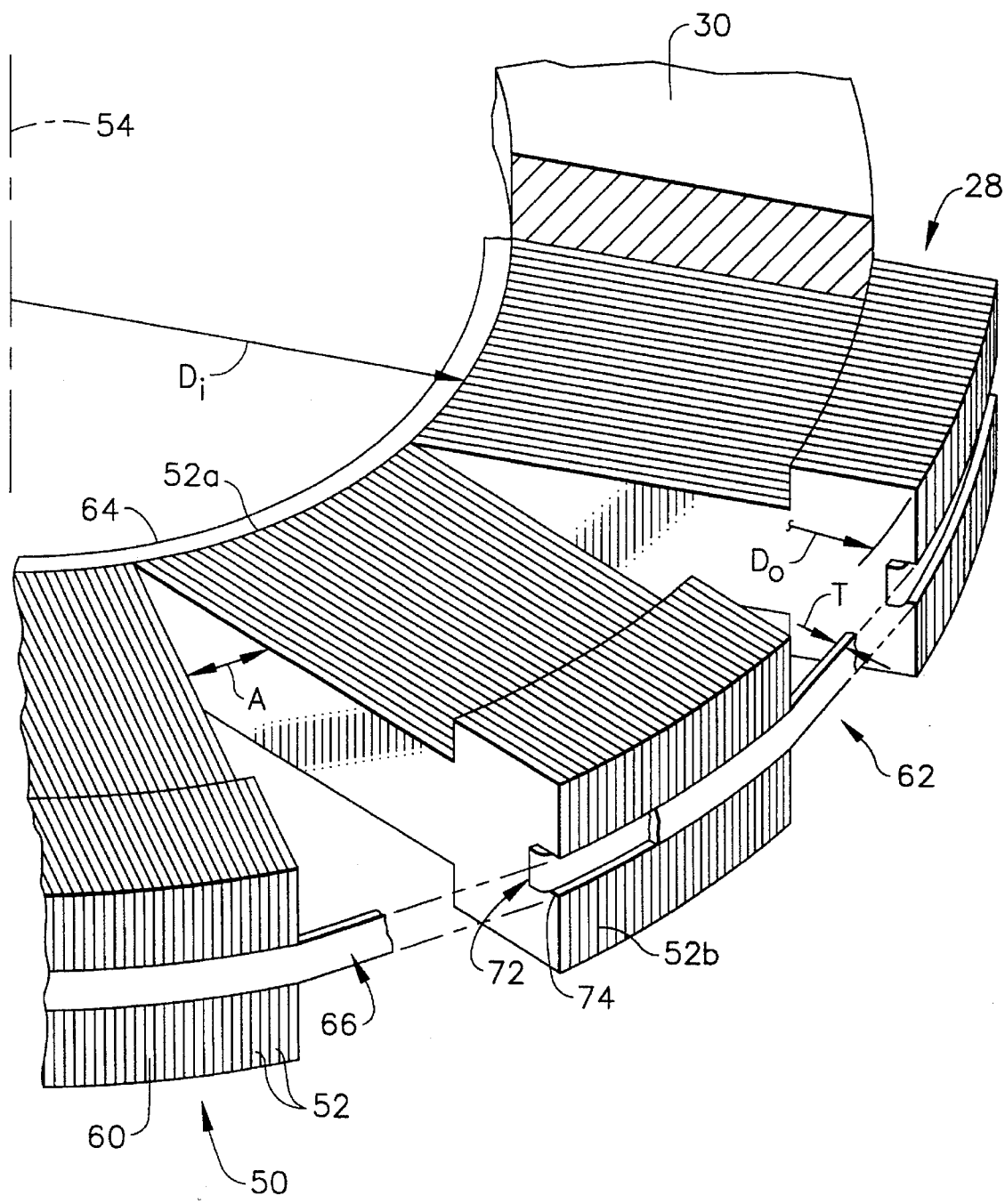
FIG. 3 is a perspective view of a portion of the outer stator illustrated in FIG. 2 showing an annular band surrounding a plurality of lamination groups.

As illustrated in more particularity with FIG. 3, the several outer ends 52b of the individual laminations 52 in the groups 50 are disposed side-by-side, which results in a substantial number of interfaces between the abutting laminations 52 over which the band 66 must slide during thermal expansion and contraction of the outer core 28. Such interfaces may lead to increased friction between the laminations 52 and the band 66 disposed in sliding contact therewith. Although the band 66 may be a unitary, complete ring which can be conventionally shrink-fitted to the perimeter 60 of the outer core 28, in a practical embodiment, one or more fasteners 70 are included in the band 66 as illustrated in FIG. 2 for effecting the desired amount of tension therein. Since the fasteners 70 are used to tension the band 66. They necessarily will cause the band 66 to slide around the perimeter 60 as the fasteners 70 are tightened to decrease the effective length of the band 66 to generate tension therein. Accordingly, the friction developed at the interfaces of the adjacent laminations 52 as described above with respect to FIG. 3 can lead to a non-uniformity in tension throughout the band 66, with more tension being generated closer to the fasteners 70 than away therefrom around the perimeter 60 of the outer core 28 since the collective friction forces increase further away from the fasteners 70. To reduce this friction, the outer core 28 preferably also includes a plurality of slip or slide plates 72 in the form of elongate bands as illustrated in FIG. 3 which are disposed between respective ones of the groups 50 and the band 66 for allowing the band 66 to slide on the slide plates 72, instead of directly on the laminations 52, circumferentially around the perimeter 60. The slide plates 72 may be formed of the same material, such as stainless steel, as the band 66 itself, and since the slide plates 72 are continuous and relatively smooth members as compared to the discontinuous interfaces formed by the abutting laminations 52, friction between the band 66 and the laminations 52 will necessarily be reduced. In this way, as the fasteners 70 illustrated in FIG. 2 are suitably tightened, tension in the band 66 will be more uniformly distributed around the perimeter 60 of the outer core 28 as the band 66 elastically stretches and, therefore, slides circumferentially.

In the preferred embodiment illustrated in FIG. 3, each of the groups 50 preferably includes a U-shaped, flat bottomed recess 74 which extends in the circumferential direction in the lamination outer ends 52b and is sized and has a suitable depth to receive therein both a respective one of the slide plates 72 and a respective portion of the band 66 to restrain axial movement thereof while allowing circumferential movement of the band 66 therein in this way, neither the slide plate 72 nor the band 66 can slip axially from the lamination outer ends 52b, with the circumferential movement of the band 66 being allowed during thermal expansion and contraction of the outer core 28.

Of course, various additional provisions may be provided for reducing friction between the band 66 and the lamination groups 50 such as suitable conventional fraction reducing films, coatings, or platings of the band 66 itself, or on the slide plates 72, or in the recesses 74 where the slide plate 72 are not utilized. And, the bend 66, including the fasteners 70, may be initially heated at assembly for providing a shrink-fit of the band 66 around the perimeter 66 as the band 66 cools and contracts, to effect more uniform initial tension in the band 66. The fasteners 70 may then be used to adjust the tension, if desired, or for disassembling the band 66 if required.

The band 66 may include a single fastener 70, but a plurality of fasteners 70 such as the two equidistantly spaced apart fasteners 70 illustrated in FIG. 2 are preferred to improve the uniformity of tension generated in the band 66 around the perimeter 60 of the outer core 28. As shown in FIG. 2, the two fasteners 70 are preferably disposed 180° apart to improve the uniformity of tension within the band 66. And, the fasteners 70 are preferably also disposed between adjacent ones of the groups 50 in the gaps 62 to ensure suitable access for tightening the fastener 70, as well as for ensuring that the fastener 70 is in-line in the band 66 to minimize elongation of the band 66 during thermal expansion which might reduce the tension therein after repeated thermal cycles.

Figure 4:
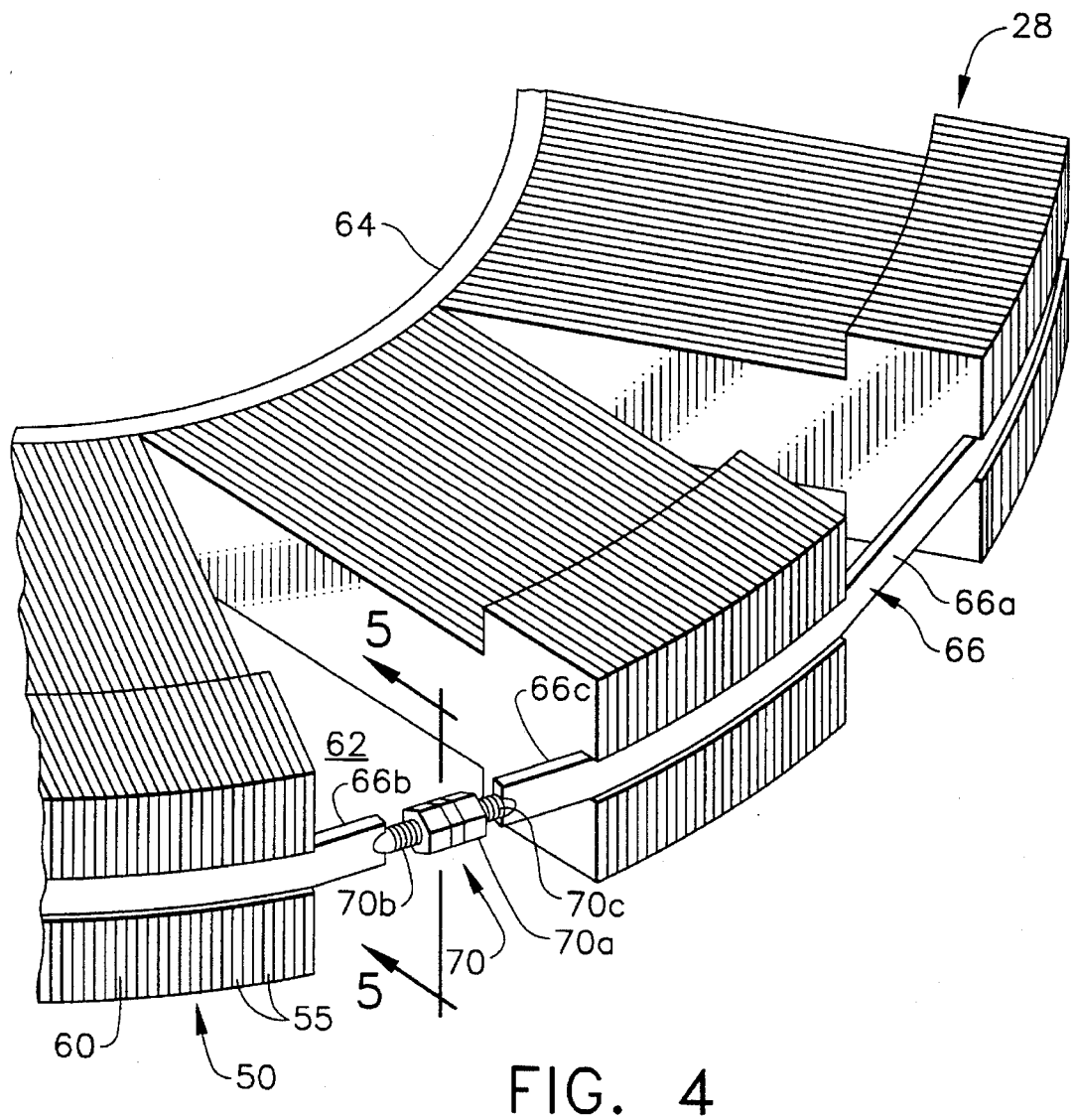
FIG. 4 is a perspective view of a portion of the outer stator illustrated in FIG. 2 illustrating an exemplary fastener colinearly joining together opposing ends of the band.
Figure 5:
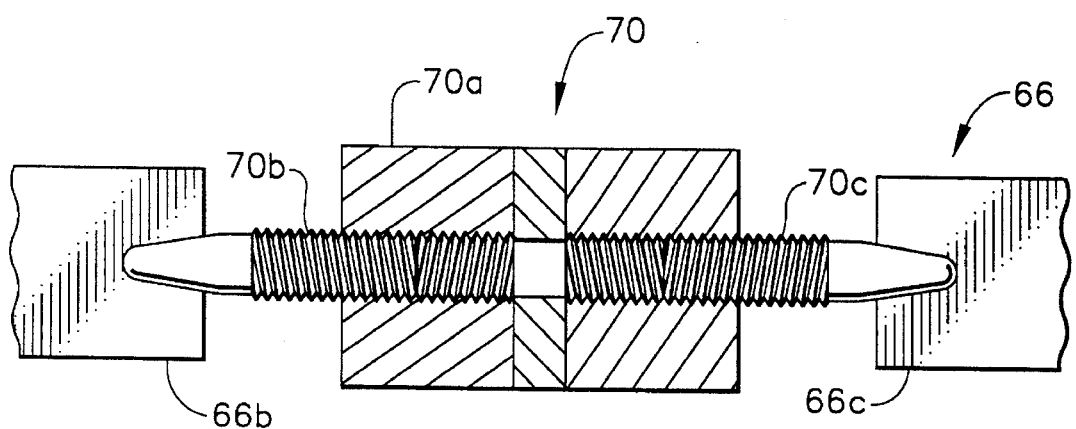
FIG. 5 is a sectional view through the band fastener illustrated in FIG. 4 taken along line 5—5.

More specifically, and referring to FIGS. 4 and 5, the band 66 is preferably split to form first and second opposing ends 66b and 66c, and the fastener 70 is in the preferred form of an adjustable turnbuckle which joins together the band first and second ends 66b, 66c, and is adjustable to draw together the first and second ends 66b, 66c to generate the required tension in the band 66 as the band 66 is tightened around the perimeter 60 of the outer core 28. The fastener 70 in the form of the turnbuckle preferably includes a tubular sleeve 70a suitably threaded to a left-handed, threaded first bolt 70b and a right-handed, threaded second bolt 70c, all disposed coaxially or colinearly with each other and with the band 66. The first bolt 70b is suitably fixedly joined to, by welding for example, and extends colinearly from the first band end 66b, and the second bolt 70c is suitably fixedly joined to, by welding for example, and extends colinearly from the band second end 66c. The sleeve 70a has internal threads at opposite ends thereof which are complementary to the threads of the first and second bolts 7b, 70c which are received therein.

The sleeve 70a has the external form of a hexagonal nut for being rotatable by a suitable wrench (not shown) for drawing together the first and second bolts 70b, 70c, and in turn the band first and second ends 66b, 66c for increasing tension in the band 66 as desired. The sleeve 70a is rotatable in an opposite direction for separating the first and second bolts 70b, 70c to decrease tension in the band 66. Since the turnbuckle 70 is preferably directly in-line with the band 66 itself, it too forms a straight section in one of the gaps 62 to more effectively generate tension in the band 66. The turnbuckle 70, itself, remains straight within its respective gap 62 between adjacent groups 50, and, therefore, the fastener 70, itself, does not contribute to any slackening in the band 66 during the thermal expansion and contraction cycles of the outer core 28, as can occur from an eccentrically configured fastener. Each of the several fasteners 70 used in the band 66 are preferably similarly configured for joining together respective intermediate ends formed at the several locations in the band 66 for collectively tightening the band 66 during initial assembly. The fasteners 70 are preferably tightened simultaneously to gradually increase tension in the band 66 uniformly around the perimeter 60.

While there have been described herein what are considered to be preferred and exemplary embodiments of the present invention, other modifications of the invention shall be apparent to those skilled in the an from the teachings herein, and it is, therefore, desired to be secured in the appended claims all such modifications as fall within the true spirit and scope of the invention, Accordingly, what is desired to be secured by Letters Patent of the United States is the invention as defined and differentiated in the following claims:

We claim:

1. A stator core for an electromagnetic pump comprising:
   a plurality of circumferentially adjoining groups of flat laminations disposed about a common centerline axis and collectively defining a central bore at radially inner ends thereof and a discontinuous outer perimeter at radially outer ends thereof, adjacent ones of said groups diverging radially outwardly at an acute angle therebetween to form a V-shaped gap therebetween; and
   an annular band surrounding said groups along said outer ends, said band being predeterminedly tensioned to clamp together said laminations in each of said groups, and said band being predeterminedly flexible in a radial direction relative to said centerline axis to form substantially straight bridge sections bridging said gaps between said adjoining groups,
   wherein said annular band has a thickness of about 0.9 mm.

2. A core according to claim 1 wherein said band includes:
   first and second opposing ends; and
   a fastener joining together said first and second opposing ends and being adjustable to draw together said first and second ends to generate tension in said band.

3. A core according to claim 2 wherein said fastener comprises a turnbuckle including a left-handed first bolt extending colinearly from said band first end, a right-handed second bolt extending colinearly from said band second end, and a tubular sleeve having internal threads at opposite ends thereof threadingly receiving said respective first and second bolts, said sleeve being rotatable for drawing together said first and second bolts to increase tension in said band.

4. A core according to claim 3 further comprising a plurality of slide plates disposed between respective ones of said groups and said band for allowing said band to slide on said slide plates circumferentially around said perimeter.

5. A core according to claim 4 wherein each of said groups includes a recess extending circumferentially in said outer ends sized to receive therein one of said slide plates and a portion of said band to restrain axial movement thereof while allowing circumferential movement of said band.

6. A core according to claim 4 wherein said band includes a plurality of said turnbuckles equidistantly spaced around said perimeter.

7. A core according to claim 4 wherein said turnbuckle is disposed between adjacent ones of said groups in said gap.

8. A core according to claim 4 further comprising a ring disposed coaxially in said bore for aligning said groups at said radially inner ends of said laminations, said ring being in compression due to tension in said band.

9. A stator core for an electromagnetic pump comprising:
   a plurality of circumferentially adjoining laminations disposed about a common centerline axis and collectively defining a central bore at radially inner ends thereof and an outer perimeter at radially outer ends thereof;
   an annular band surrounding said laminations along said radially outer ends, said band being predeterminedly tensioned to clamp together said laminations; and
   a plurality of slide plates disposed between said annular band and respective pluralities of said radially outer ends of said laminations for allowing said band to slide on said slide plates circumferentially relative to said radially outer ends during tensioning of said band.

10. The stator core as defined in claim 9, wherein said laminations are flat elements of constant thickness, said flat laminations being arranged in a plurality of groups, each group comprising a plurality of mutually parallel adjoining laminations, wherein adjoining ones of said groups diverge radially outwardly at an acute angle therebetween to form a respective V-shaped gap therebetween.

11. The stator core as defined in claim 10, wherein each of said plurality of slide plates is disposed between said annular band and the radially outer ends of a corresponding one of said groups of flat laminations.

12. The stator core as defined in claim 9, wherein each of said radially outer ends of said laminations has a recess for receiving one of said slide plates.

13. The stator core as defined in claim 11, wherein each of said radially outer ends of a corresponding one of said groups of flat laminations has a recess for receiving a corresponding one of said slide plates.

\* \* \* \* \*